Sept. 10, 1957  A. A. HALE  2,805,635
APPARATUS FOR JOINING MUFFLER PARTS
Filed April 29, 1952  9 Sheets-Sheet 2
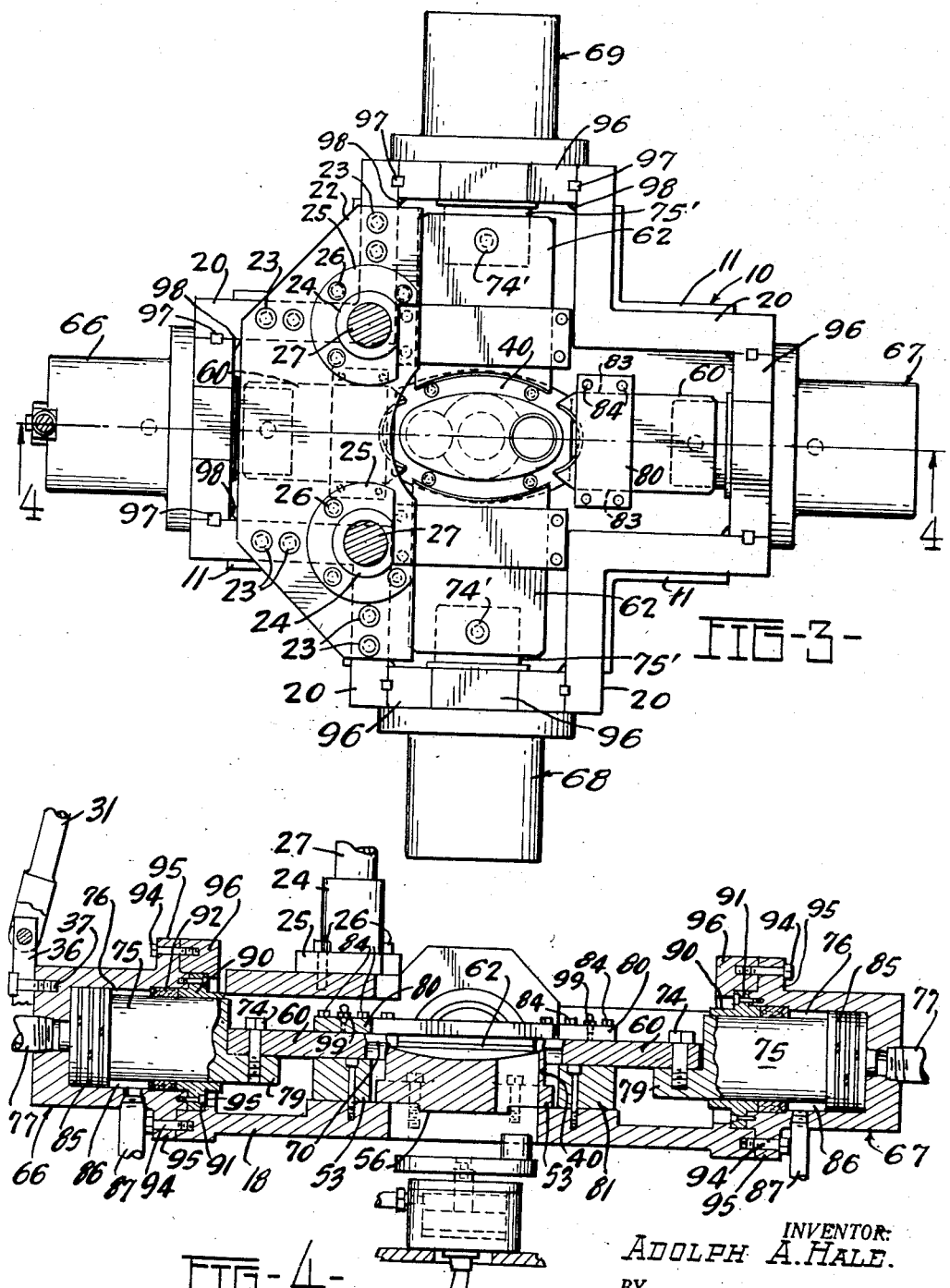
FIG-3-
FIG-4-
INVENTOR:
ADOLPH A. HALE.
BY Harry P. Ernsberger
ATTORNEY Sept. 10, 1957  A. A. HALE  2,805,635
APPARATUS FOR JOINING MUFFLER PARTS
Filed April 29, 1952  9 Sheets-Sheet 3
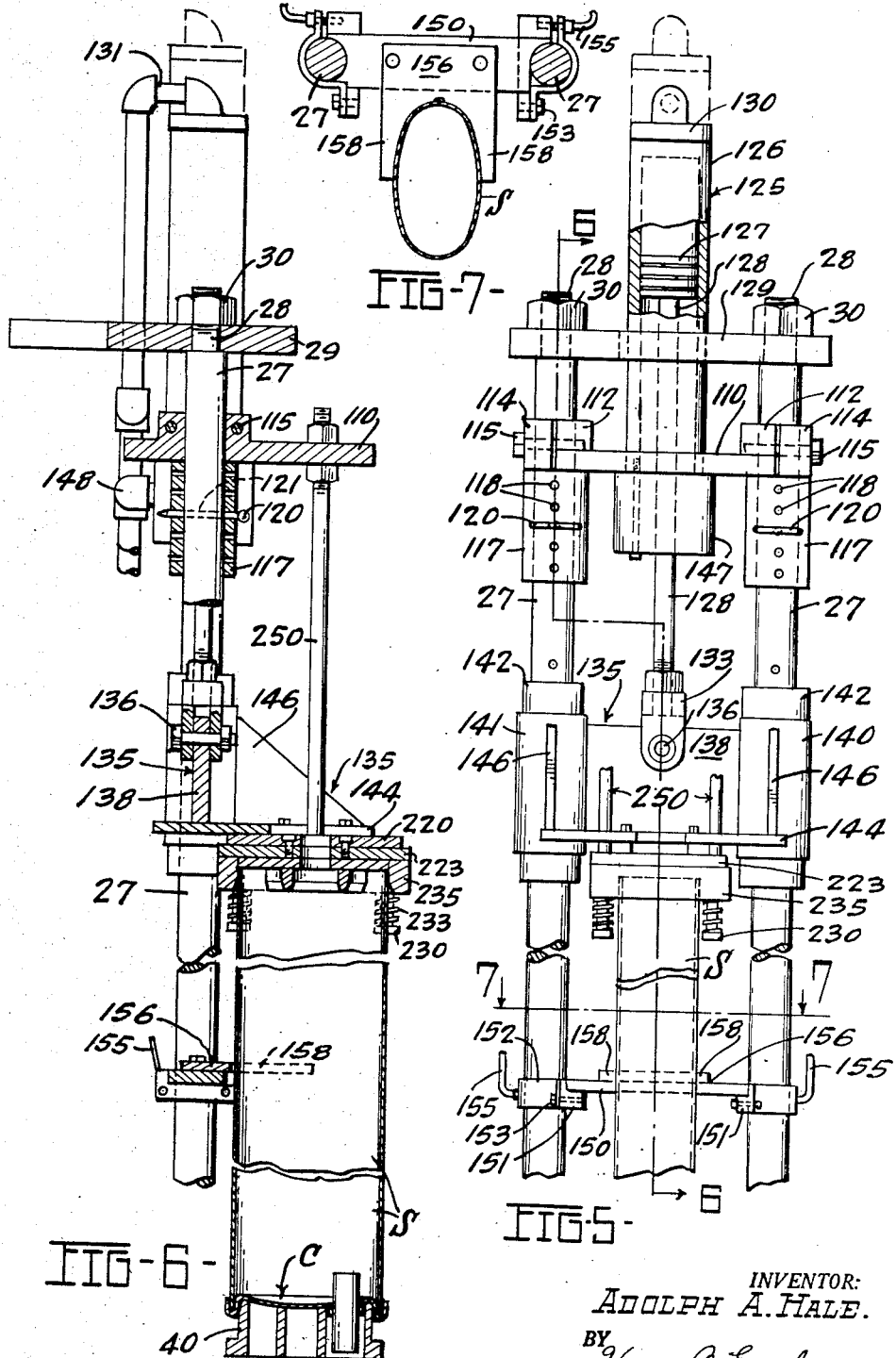
INVENTOR:
ADOLPH A. HALE.
BY Harry O. Erneberger
ATTORNEY

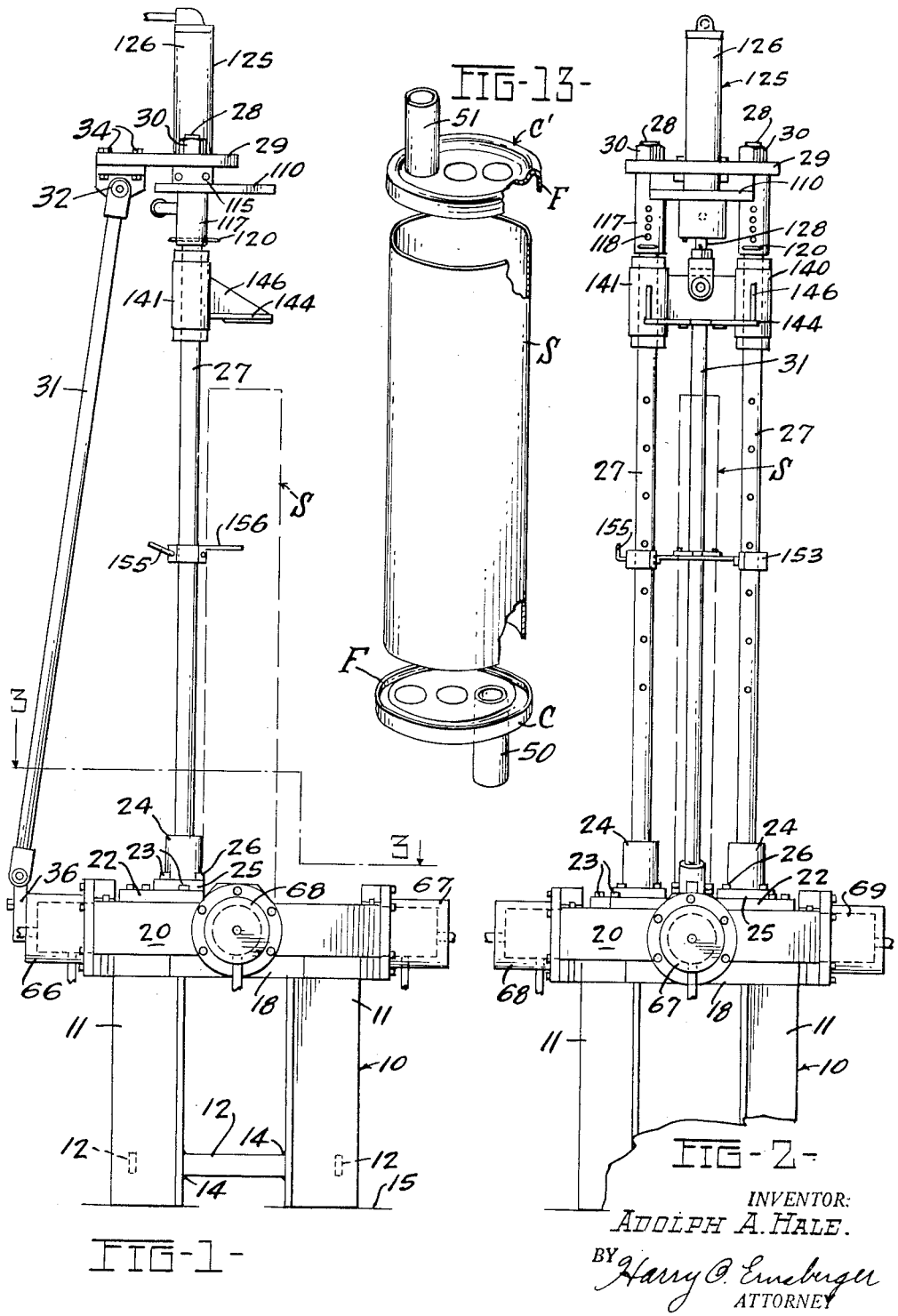

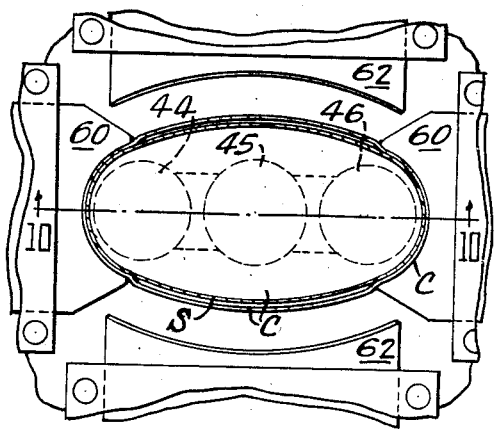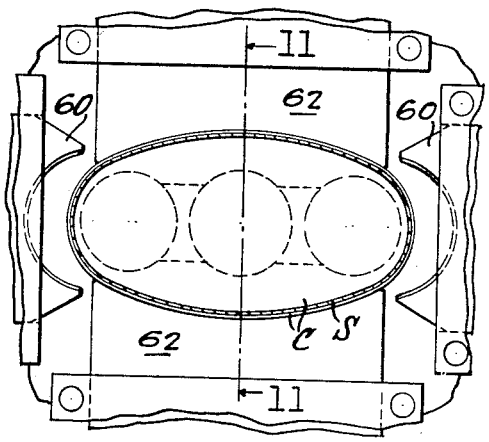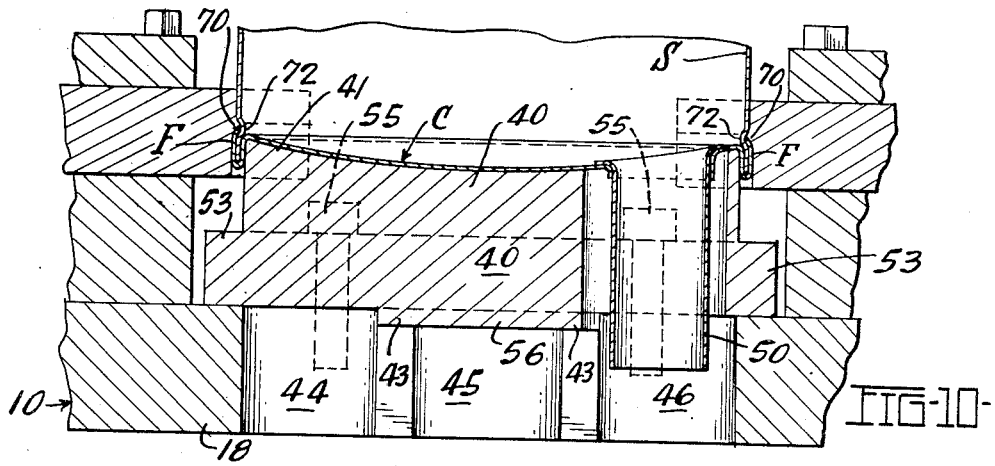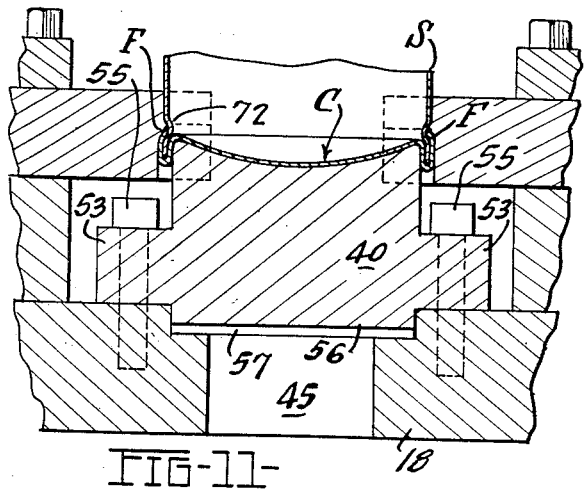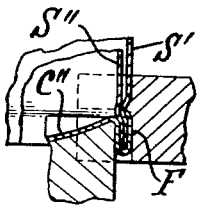

Sept. 10, 1957     A. A. HALE     2,805,635
APPARATUS FOR JOINING MUFFLER PARTS
Filed April 29, 1952     9 Sheets-Sheet 5

INVENTOR:
ADOLPH A. HALE.
BY
Harry O. Ernsberger
ATTORNEY

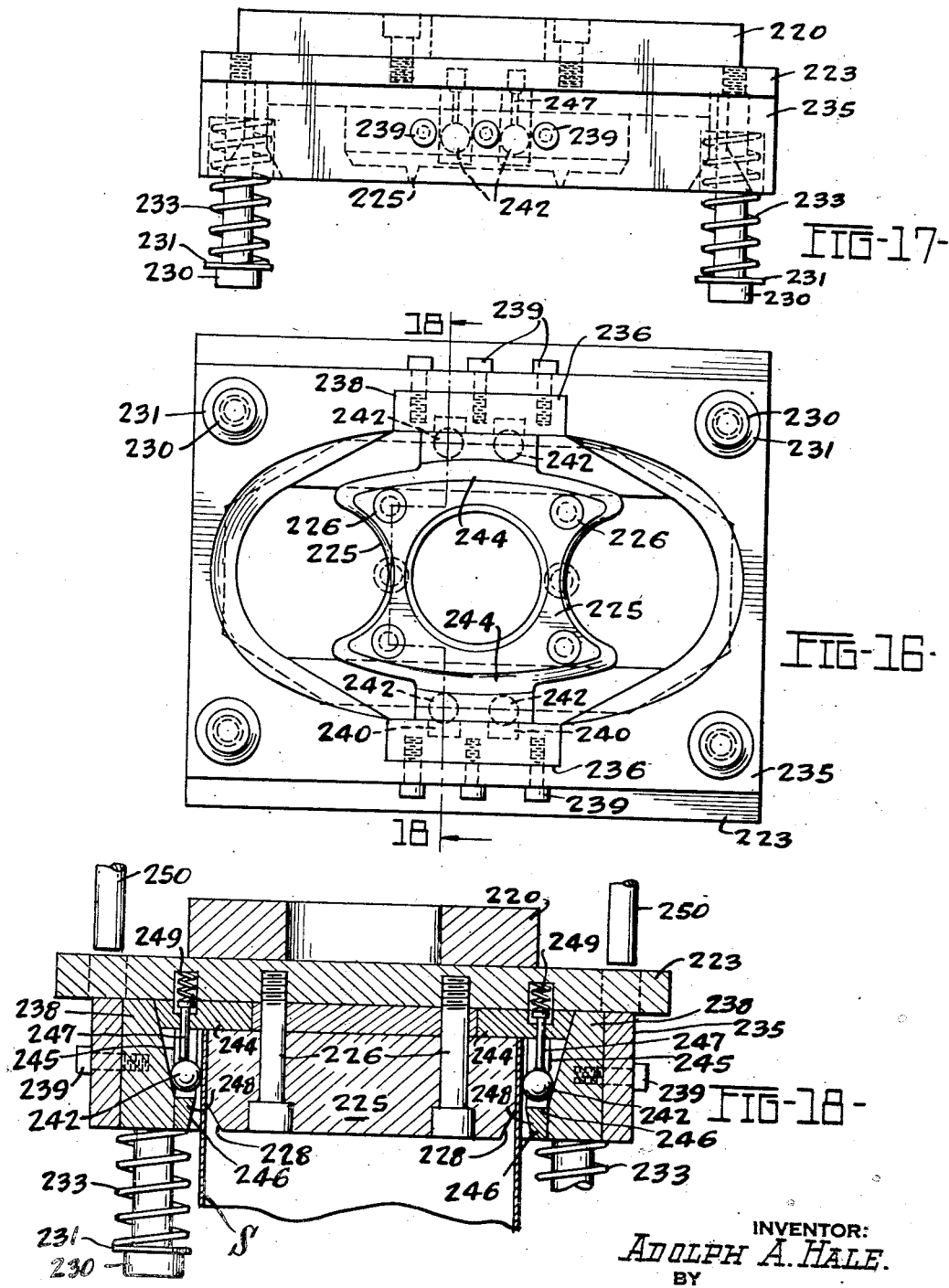

Sept. 10, 1957 A. A. HALE 2,805,635
APPARATUS FOR JOINING MUFFLER PARTS
Filed April 29, 1952 9 Sheets-Sheet 7
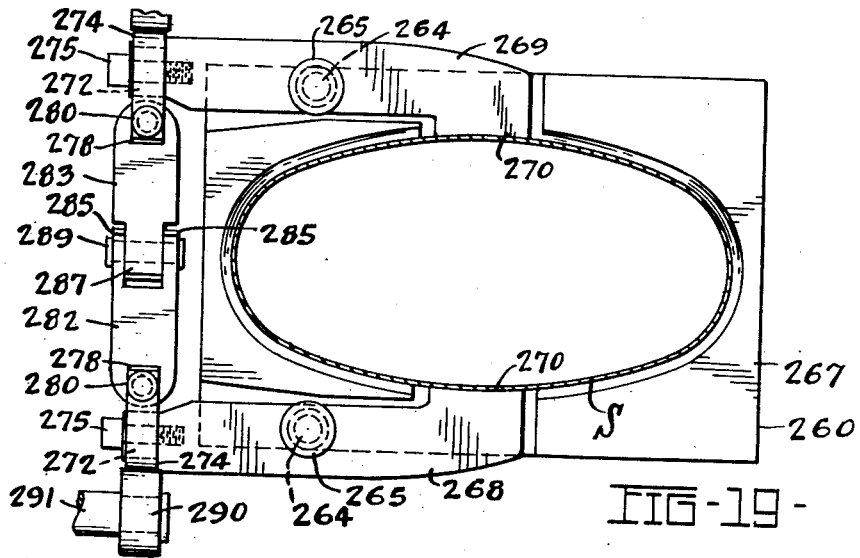
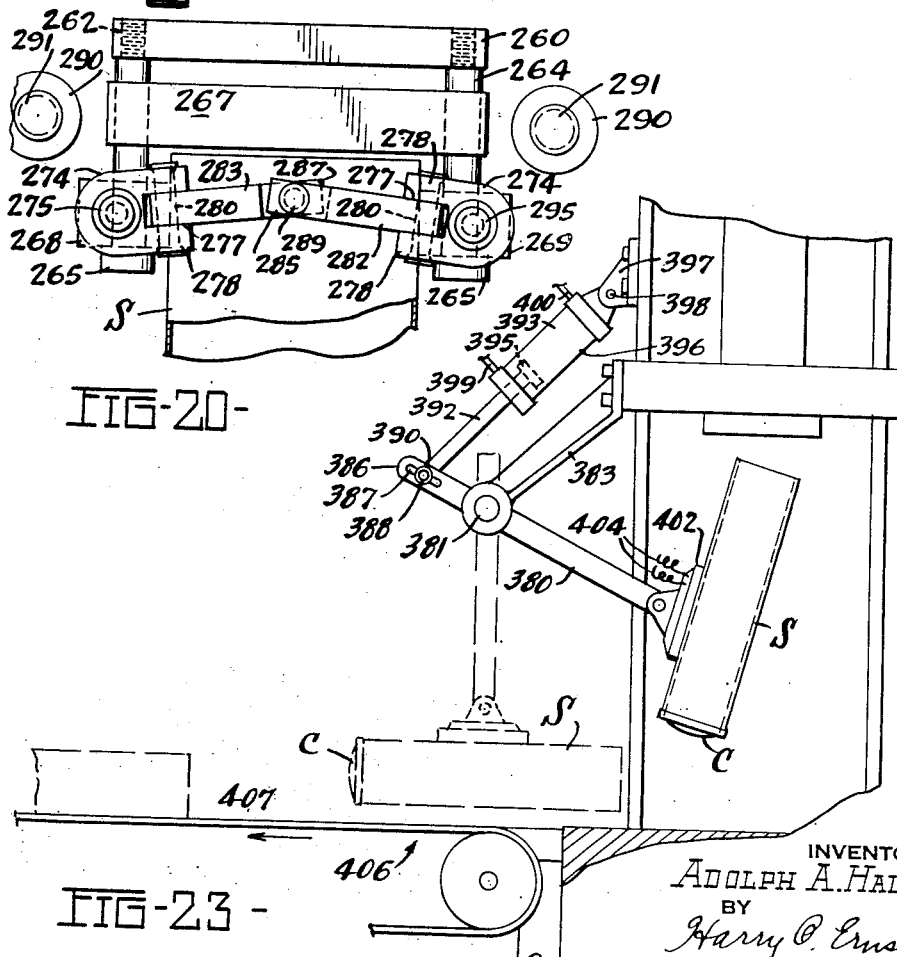
INVENTOR:
ADOLPH A. HALE.
BY
Harry C. Ernsberger
ATTORNEY

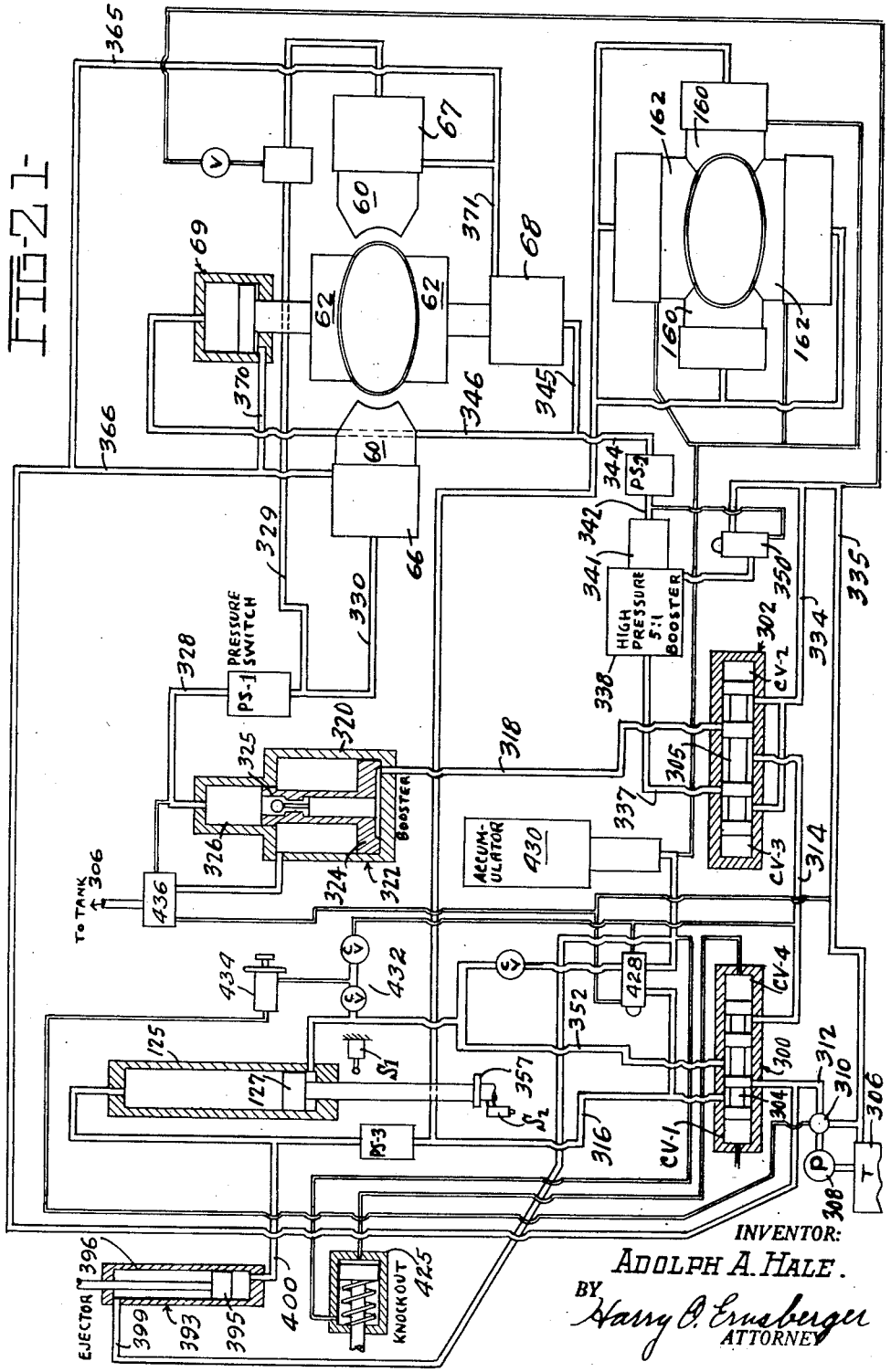

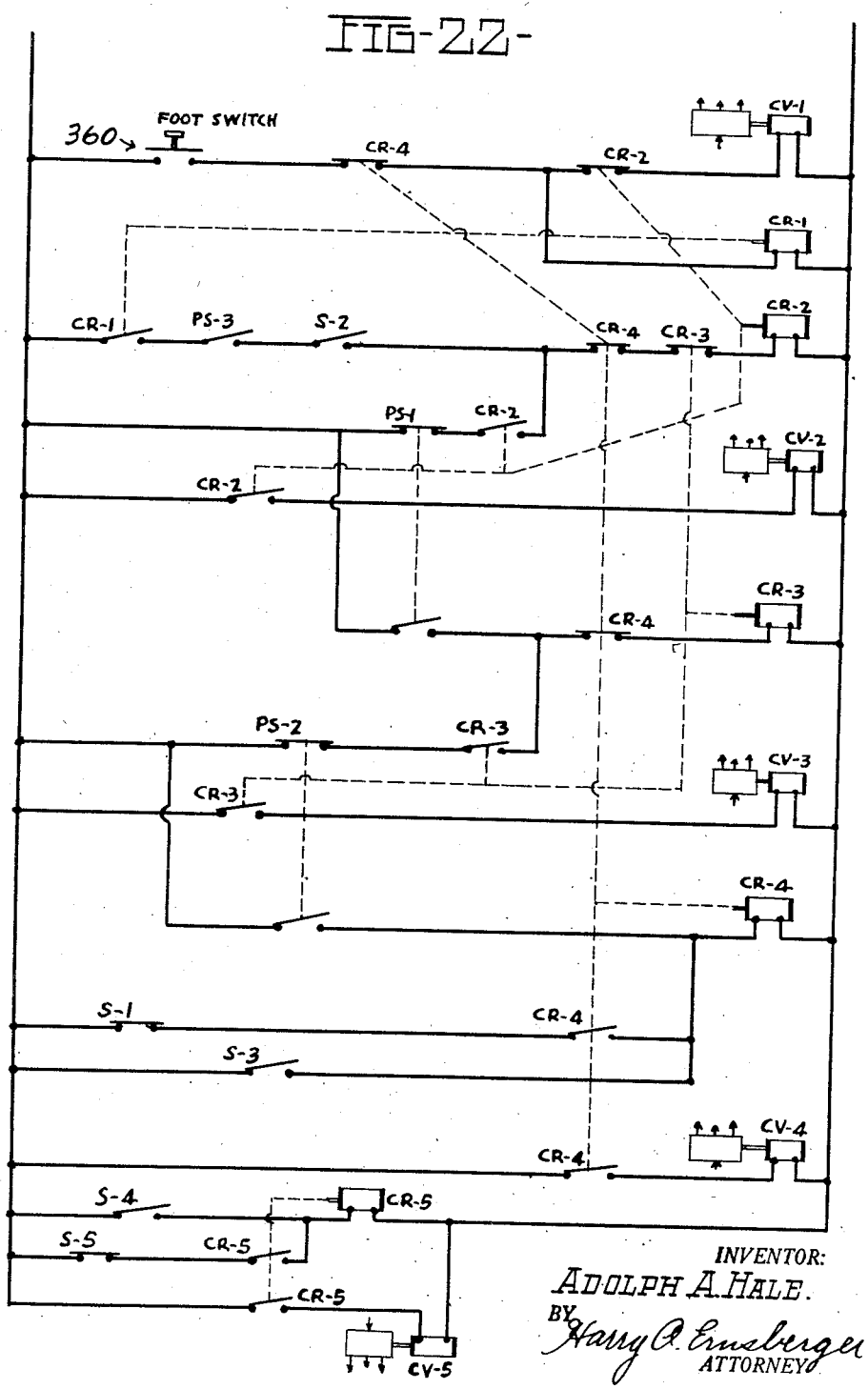

United States Patent Office 2,805,635
Patented Sept. 10, 1957

2,805,635

APPARATUS FOR JOINING MUFFLER PARTS

Adolph A. Hale, Spring Lake, Mich., assignor to Oldberg Manufacturing Company, Grand Haven, Mich., a corporation of Michigan Application April 29, 1952, Serial No. 284,977

7 Claims. (Cl. 113—1)

This invention relates to apparatus for joining metal parts together and more especially to means for securing headers or end closures to tubular bodies.

An object of the invention lies in the provision of an apparatus adaptable for securing end head structures or headers to muffler shells or bodies having a single or multiple layer wall structure, the apparatus including pressure means for distorting the metal of the head structure into interlocking engagement with the muffler body wall construction.

Another object of the invention embraces the provision of apparatus including sets of dies for securing a head structure upon a tubular body whrerein the sets of dies are automatically operated successively in securing the head structure to the body, the apparatus including pressure means for maintaining the body in engagement with the head structure during the operation of the dies.

A further object of the invention resides in a plurality of hydraulically actuated means for carrying out the performance of several successive operations in securing head structures into locking engagement with end portions of the wall structure of a tubular body wherein the several hydraulically actuated means are brought into proper sequential operation by electrically actuated control means.

Another object of the invention embraces the provision of an apparatus for affixing head structures in the ends of muffler shells or bodies, the apparatus being readily adaptable for accommodating various sizes of muffler shell and head constructions.

Another object of the invention resides in the provision of means for automatically withdrawing an assembled muffler body and header construction from the header securing dies and delivering same at a point removed from the head assembling apparatus.

A further object of the invention is the provision of means for shaping a tubular body for insertion in a flanged configuration of an end header and maintaining the body in proper position during the operation of pressure means for inserting the body in the flanged configuration.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view illustrating one form of apparatus of the invention;

Figure 2 is a front elevational view of the apparatus illustrated in Figure 1;

Figure 3 is a horizontal sectional view taken substantially on the line 3—3 of Figure 1;

Figure 4 is a vertical sectional view taken substantially on the line 4—4 of Figure 3;

Figure 5 is a fragmentary elevational view of the upper portion of the apparatus;

Figure 6 is a vertical sectional view taken substantially on the line 6—6 of Figure 5;

Figure 7 is a transverse sectional view taken substantially on the line 7—7 of Figure 5;

Figure 8 is a plan view of the die arrangement showing one set of header securing dies in engagement with the work;

Figure 9 is a view similar to Figure 8 showing another set of header securing dies in engagement with the work;

Figure 10 is a vertical sectional view taken substantially upon the line 10—10 of Figure 8;

Figure 11 is an enlarged vertical sectional view taken substantially on the line 11—11 of Figure 9;

Figure 12 is a fragmentary detail view illustrating the use of the apparatus in affixing a closure to a double-walled shell;

Figure 13 is an expanded view illustrating a shell and end closures or heads disposed in spaced relation for purposes of illustration;

Figure 16 is a plan view of a fixture carried by the body setting ram engageable with an open end of the muffler body for lifting a muffler body and assembled head out of the head securing dies;

Figure 17 is a front elevational view of the construction shown in Figure 16;

Figure 18 is a detail sectional view taken substantially on the line 18—18 of Figure 16;

Figure 19 is a plan view of another form of fixture for lifting a muffler with headers secured to both ends out of the head securing dies;

Figure 20 is a front elevational view of the construction shown in Figure 19;

Figure 21 is a diagrammatic view illustrating the hydraulic actuators and fluid circuits therefor for operating various components of the apparatus;

Figure 22 is an electrical circuit diagram of the electrical components for initiating and controlling the operation of the hydraulic actuators and associated mechanism, and Figure 23 is an elevational view illustrating a means for removing the work from the head securing apparatus after completion of a head securing operation.

Figure 14:
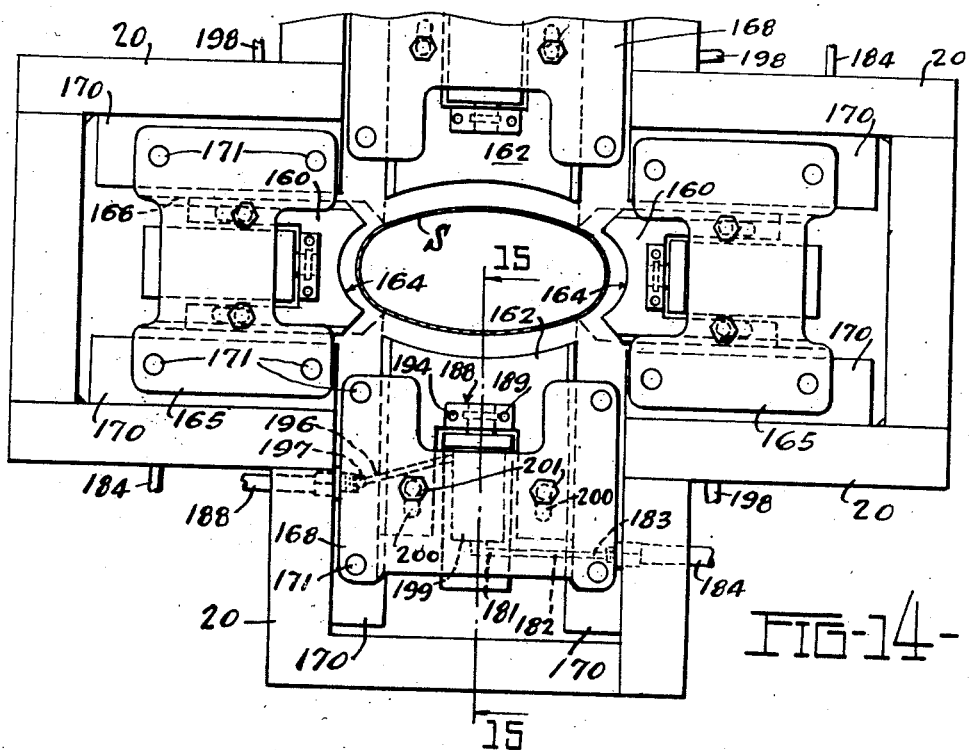
Figure 14 is a fragmentary plan view illustrating body shaping dies or members associated with the header securing dies.

While the apparatus disclosed is particularly usable for carrying out a novel method of affixing end closures or headers to hollow bodies such as muffler shells used for attenuating sound waves entrained with exhaust gas streams discharged from internal combustion engines, it is to be understood that the apparatus may be used for securing elements to various types of tubular bodies or wherever the apparatus may be found to have utility in securing elements together.

Referring to the drawings in detail and more especially to Figures 1 through 6, the apparatus is carried upon a suitable base or frame 10 which is preferably fabricated of thick metal plates or members of L-shaped cross-section indicated at 11 joined together by cross members 12, the cross members being preferably welded to the L-shaped members 11 as indicated at 14. The L-shaped base members as shown in Figures 1 and 2 are disposed in a vertical position, the lower ends adapted to rest upon a floor 15 or other supporting surface.

Mounted upon the upper end of the L-shaped members 11 is a bed-plate 18 adapted to support the mechanism for affixing the end heads or headers to the shells. The bed-plate 18 is formed with upwardly extending L-shaped portions 20 which are adapted to support hydraulic actuators for operating the sets of dies or metal coining devices for securing the headers to the shells. The plate 18 may be welded or otherwise fixedly secured to the L-shaped members in order to form a rigid frame construction.

Secured to one pair of the L-shaped members 20 is a plate or member 22 held in position by means of screws 23. Mounted upon the member 22 are pillow blocks or fittings 24 provided with flanges 25 securely fastened to the plate member 22 by means of bolts 26 or other means. The blocks 24 provide a supporting means for a pair of upwardly extending posts or rods 27 which are formed at their upper ends with threaded tenons 28, shown in Figure 6, extending through openings in a suitable plate or member 29, the tenons being secured to the plate by means of nuts 30. In this manner the posts 27 are held in proper position and form part of an upper frame structure of the machine.

In order to reinforce or provide a rigid construction for the upper frame structure, a bracing bar or strut 31 is provided as particularly illustrated in Figures 1, 2 and 4, the upper end being secured to a fitting 32 carried by the plate 29 by means of bolts 34. The lower extremity of the bracing strut 31 is secured to a plate 36 which in turn is secured by bolts 37 to one of the cylinder head constructions of a hydraulic actuator, an arrangement to be hereinafter described.

The apparatus is inclusive of header securing dies and pressure fluid actuators therefor, the dies being arranged to distort, bend or coin the metal of the headers into securing relation with the hollow bodies or muffler shells. Centrally mounted upon the bed-plate 18 of the frame is a pedestal or platen 40 formed with a peripheral contour corresponding to that of the end closure or header C that is to be affixed to the wall of a shell S. The closures or headers C are usually of convex shape and the headers at the ends of a muffler shell are respectively provided with inlet or outlet tubes for passage of exhaust gases through the muffler. This convex curvature of the end head is illustrated clearly in Figures 10 and 11. The pedestal or platen 40 is supported by the bed-plate 18 and is provided with openings 44, 45 and 46 to accommodate a gas inlet or outlet tube, the position of which is dependent upon the particular design of interior construction (not shown) of a muffler. In Figure 13 there are illustrated end heads or headers C and C', one being provided with a gas inlet, the other being provided with an outlet, and it should be noted that in the inlet end the gas inlet tube 50 is at one side of the central axis of the muffler. In the opposite end head C', the gas exit tube 51 is at the opposite side of the center of the muffler axis with respect to the inlet tube. In certain types of mufflers the inlet and outlet tubes may be centrally disposed with respect to the shell. Hence, the openings 44, 45 and 46 are provided in the bed-plate 18 to accommodate the gas inlet and outlet tubes affixed to the end head construction. Interchangeable pedestals or header supports 40 may be employed, each provided with a single opening to accommodate a gas inlet or outlet tube secured to the header, the opening being at the central zone or at either side of the center, depending upon the relative position of the tube secured to the header.

The pedestal or header support 40 is provided with flange portions 53 which rest upon the bed-plate 18 and are fixedly secured thereto by means of bolts 55. The pedestal 40 is formed with a depending tang or projection 56 which snugly fits into a recess 57 formed in the bed-plate in order to maintain the pedestal 40 in a central position.

Two sets of dies or header securing devices are provided movable in horizontal directions for securing the end closures or headers to the shells. As particularly shown in Figures 3 and 4, the dies 60 of one set are disposed in opposed relation and are movable toward and away from each other in a common axis for the purpose of bending or distorting flanged portions of an end head inwardly. A second set of dies 62 is provided wherein the dies are in opposed relation, move along an axis at right angles to the axis of movement of the dies 60 and are for the purpose of completing the operations of securing the headers to the shells through engagement or interlocking of the header flanges with the shells. The dies 60 are actuated by separate pressure fluid means or hydraulic actuators designated 66 and 67 which are of substantially identical construction, and the dies 62, movable in directions at right angles to the dies 60, are actuated by separate pressure fluid means or hydraulic actuators 68 and 69.

Each of the dies 60 has its forward or header engaging portion of curved configuration, as shown in Figure 10, to fit the acutely or sharply curved portions or zones of an oval or elliptically shaped header or end closure construction C. The face of each die 60 is formed with a linear projection or ridge 70 of concentric relation to the curvature of the remaining face portions of the die for the purpose of distorting the flange portion F of an end head construction into close interlocking engagement with the wall of the shell S, the die bending the extremity of the edge zone of the flange F inwardly causing the shell wall to be distorted as at 72 so as to establish an interlocking fastening or permanent connection between the flange F of the end head and the shell. By this means the distorted or bent flange F is pressed into the shell to depress the portion 72 of the shell providing a tight joint assuring a permanent connection between the end head and the shell.

With particular reference to Figure 4 it should be noted that each die 60 is in the form of a flat plate which is joined by means of a bolt 74 with a piston or piston head 85 formed on a piston body or shank adapted for reciprocation within a cylinder 76 into which fluid may be injected through an inlet pipe 77 to move the piston 75 toward a position wherein the die engages the header. The piston body 75 is provided with an extension or ledge 79 having a threaded opening into which the bolt 74 extends in order to provide a positive connection between the die 60 and the adjacent piston body 75. The rear end wall of each die 60 abuts the piston body 75 to transfer the fluid pressure directly to the die without placing excessive stress on the bolt 74.

The plate 60 is guided in proper direction by means of spacing blocks 81 carried by the bed-plate 18, each spacing block being formed with guide surfaces or ways through which the die 60 is slidably mounted. Plates 80 may be employed to prevent displacement of the die, the plates being held in position by means of bolts 84.

It should be noted that the piston or piston body 75 of each of the hydraulic actuators is formed with a piston head 85 thereby providing an annular chamber 86 at one side of the piston head to accommodate the ingress of pressure fluid through a pipe 87 for the purpose of retracting the die 60 after the completion of a flange distorting operation on a header. The cylinder 76 is closed at its outer end by means of a head 90 held in place by bolts 91, a sealing ring 92 being utilized to avoid leakage of fluid along the exterior cylindrical wall of the piston body 75. The cylinder 76 is secured to the bed-plate 18 and to the L-shaped frame members 20 by means of bolts 94 extending through openings in a suitable flange 95 formed on the cylinder construction 76 as shown in Figure 4.

The adjacent pairs of legs of L-shaped members 20 which form supporting means for the hydraulic actuators are joined by means of members 96 welded to the members 20 and additionally the L-shaped members and the bridging members 96 are provided with registering recesses to accommodate keys 97 which aid in resisting the outward thrust when pressure fluid is introduced into the outer ends of the cylinders of actuator 67 through the fluid inlet pipes 77. The bridge members 96 are also welded to the L-shaped members as indicated at 98 in Figure 3. The die guiding plates 80 are each provided with a fitting 99 through which lubricant may be introduced in order to provide lubrication for the guiding surfaces of the die plate 60.

The other set of header securing dies 62 is somewhat wider than the dies 60 as they engage the side zones of the oval or elliptical headers of the muffler construction, the dies 62 being operated individually by means of fluid pressure means or hydraulic actuators 68 and 69. As the hydraulic actuators 68 and 69 are of the same construction as the hydraulic actuators for the dies 60, the description of the hydraulic actuator 67 hereinbefore set forth applies to actuators 68 and 69. The dies or die plates 62 are connected to the pistons 75' of the actuators by means of suitable bolts 74' as shown in Figure 3.

The operation of the sets of dies 60 and 62 takes place in sequence, the dies 60 moving inwardly to fix the flange of the sharply curved portions of the header to the shell or hollow body S, and after dies 60 have been retracted or moved away from the work, the dies 62 are moved inwardly to complete the coining or bending of the flange on the header into locking engagement with the shell. The mechanism for initiating and controlling the pressure fluid actuators for accomplishing this purpose will be hereinafter explained.

It will be noted from Figures 8 and 9 that the sets of dies 60 and 62 partially overlap their respective zones of engagement with the muffler shell. As shown in Figure 8, the dies 60 are in their innermost position in engagement with the end head C, and it will be seen that the extremities of the die project inwardly within and overlap the area of engagement of the dies 62 with the periphery of the header. Thus when the dies 60 are withdrawn or retracted, the dies 62 are brought into engagement with the side zones of the elliptical or oval header construction, and portions of the die overlap certain portions of the header previously engaged by dies 60. By providing this overlap in die engagement with the header, the flange F is distorted or bent uniformly without any wrinkling of the metal of the flange.

The apparatus as above described is especially adapted to interlock the flange of a header to a shell or hollow body when the header has been previously fitted over the end of the shell preparatory to interlocking the header flange with the shell by means of the dies 60 and 62. The apparatus may be provided with means hereinafter described for fitting or assembling the shell into the recess in the header formed by the flange F while the header is disposed upon the pedestal 40, such means including a plurality of shaping dies or means engageable with the shell adjacent the flanging dies for orienting the contour of the shell for correct registration thereof with the recess in the header so that pressure exerted axially on the shell initially moves the end zone of the shell into overlapping relation with the header flange and maintains such relationship during operation of the flanging or bending dies 60 and 62.

The upper frame structure of the apparatus is equipped with means for exerting axial pressure upon the shell for accomplishing the purposes above mentioned. The frame posts 27 support pressure fluid actuator means for exerting pressure axially of the muffler shell, the posts supporting guide means for properly positioning the shell before the hydraulic actuators are brought into operation. The hydraulic or fluid pressure actuated means for moving the shell downwardly or holding the shell in assembled relation with a header is adjustably mounted to accommodate mufflers or muffler shells of various lengths.

Mounted upon the posts 27 is a member 110 provided with semiannularly shaped boss portions 112 which are adapted to respectively mate with semiannular clamping plates or blocks 114 as shown in Figure 5. The boss portions 112 are formed with threaded apertures and clamp members 114 are bored to accommodate clamping screws 115 which may be drawn up to secure the member 110 to the post 27 in any position of vertical adjustment along the posts 27.

Slidably mounted upon each of the posts 27 is a sleeve 117 which is provided with a series of openings 118 in order to adjust the relative positions of the sleeves along the posts 27. As particularly shown in Figure 6, the sets of openings are adapted to selectively receive pins or positioning members 120 which also project through openings 121 in the posts to positively position the sleeves to establish a relative position for a shell engaging fluid actuator. The sleeves 117 are adjusted lengthwise of the posts by means of the pins 120 after which the plate 110 is moved into engagement with the upper surfaces of the sleeves and is clamped to the posts by means of the clamps 114 and bolts 115. In this manner a hydraulic actuator 125 may be disposed at a proper position above the flanging dies 60 and 62 to accommodate mufflers of a predetermined length.

The hydraulic actuator 125 for moving the muffler shell downwardly into overlapping relation with the flange on the header is inclusive of a vertically disposed cylinder 126 within which is slidably disposed a piston 127 connected to the upper end of a piston rod 128. The upper end of the cylinder 126 is provided with a head 130 connected with a pressure fluid conveying duct or tube 131 which is in communication with a source of pressure fluid through suitable valve mechanism in a manner hereinafter explained. The piston rod 128 is provided at its lower end with a threaded portion upon which is mounted a clevis 133 connected with a crosshead 135 by means of a bolt 136. The crosshead 135 is formed with a transversely extending plate 138 which is integrally formed with spaced bosses 140 and 141 bored to accommodate bearing members or sleeves 142 slidably fitted upon the posts or rods 27. The crosshead 135 is provided with a pressure pad or ram member 144 which is equipped with shell engaging and elevating devices of a character hereinafter described. The pad or ram 144 is suitably reinforced by triangularly shaped gusset plates 146 arranged in the manner shown in Figures 5 and 6.

A positioning means is provided for initially maintaining a muffler shell S in proper vertical relation before the ram 144 is brought into operation. As shown in Figures 5 and 6, a plate 150 extends between the posts 27 and is secured at each end to a block 151. Suitable clamping members 152 surround the posts 27 and are adapted to be readily clamped into engagement with the posts to hold the plate 150 in any position of relative vertical adjustment. This is accomplished by manipulation of pairs of securing bolts 153 associated with the clamping members 152. For ease of adjustment, one bolt of each pair may be equipped with a crank 155 by which the operator may change the position of the shell positioning means without the use of special tools.

Mounted upon the plate 150 is a shell engaging member 156 having a configuration substantially the same as one-half of the cross-sectional shape of the shell S. Thus the configuration of the shell engaging portion of plate 156 has projecting legs 158 which prevent lateral movement of the shell S. The construction of the clamping members 152 and securing means as well as the configuration of the guide plate 156 is clearly shown in Figure 7.

The lower end of the cylinder 126 of the hydraulic actuator 125 is formed with a fitting or head 147 to which is connected a fluid conveying duct or tube 148 for conveying fluid beneath the piston 127 in order to elevate the crosshead 135 and permit the removal of the shell S and the header interlocked thereto through the operation of the dies 60 and 62.

Certain types or constructions of mufflers are formed with multiple-layer or laminated walls, and the apparatus of my invention is adapted for affixing end closures or headers to multiple-walled shell constructions. As shown in Figure 12, the outer shell wall S' and the inner wall S'' are illustrated in connection with a header C'' secured thereto. As shown in Figure 12, the walls S' and S'' are embraced within the flange F of the header C'' and upon completion of the flanging operation by movement of the dies 60 and 62 into engagement with the flange of the header, the assembly of multiple-walled shell and header in interlocking relation appears in the form shown in Figure 12.

Due to repeated handling of the muffler shells during processing operations and in some instances as a result of the spot welding of the interior elements in the shells or hollow bodies such as baffle plate and gas passage tube assemblies, the shell is oftentimes distorted somewhat from its intended oval configuration. In order to properly align the end portion of the shell with the recess in the end header formed by the flange when the apparatus is utilized to fit the shell into a header, means are provided for shaping the shell to the proper configuration to fit within the flange on the header. One form of means for accomplishing this purpose is shown in Figures 14 and 15.

The muffler shell shaping means or dies are positioned adjacent the dies 60 and 62 for distorting the header flange into interlocking engagement with the shell. In the embodiment illustrated there are four shell shaping members or dies arranged in pairs or sets, one set 160 being movable into engagement with the sharply curved zones of the oval shape, while the dies 162 of the second set are adapted for shaping the side zones of the oval shape. The shell shaping members 160 are each equipped with a shell engaging curved surface 164 and are slidably supported upon the die members 62 shown in Figures 3 and 4.

Figure 15:
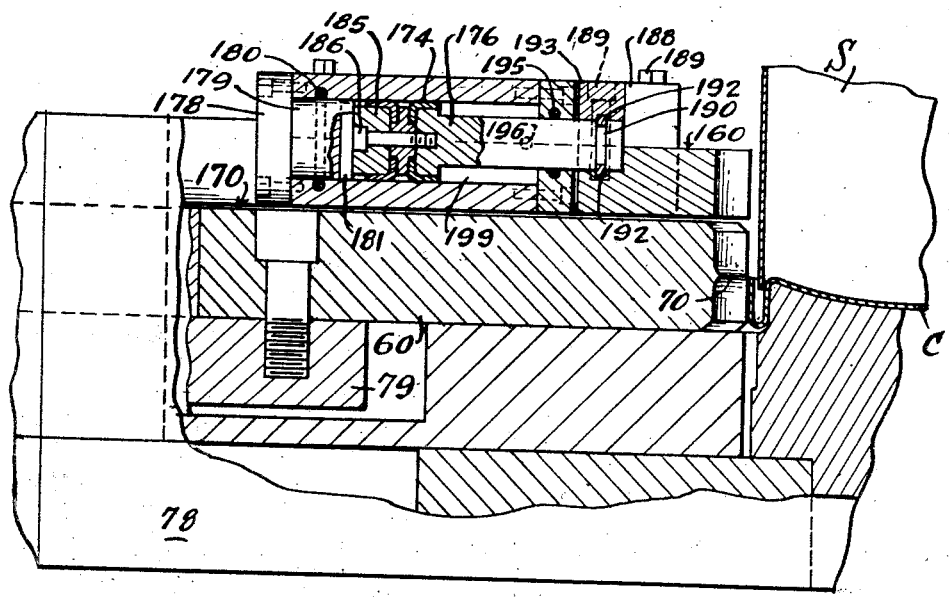
Figure 15 is a vertical sectional view taken substantially on the line 15—15 of Figure 14.

When the shaping die arrangement as shown in Figures 14 and 15 is used, the hold-down or guide plates 80 for the flanging dies 60 and 62 are removed as the slidable shell shaping members 160 serve as hold-down or guide means for the flanging dies. Disposed above and astraddle each of the shaping dies 160 is a member 165 which is formed with ways 166 forming guides for the members 160. The shaping dies 162 of the other set are slidably mounted in ways formed in members 168 which are respectively disposed above and astraddle the shaping dies 162. It will be noted from Figure 14 that members 165 and 168 are of similar shape, but the ways in members 168 are spaced a greater distance to slidably accommodate the shaping members 162 which are of greater width than members 160. The members 165 and 168 are secured to blocks 170 within the L-shaped frame members 20 and are secured in place by means of bolts 171.

As all of the shaping members are operated by hydraulically actuated means of one type, a description of one means will suffice. The actuating means for each of the shaping dies is inclusive of a piston 174 carried by a piston rod 176 mounted in a bore formed in member 168 which provides a cylinder in which the piston 174 is adapted for reciprocation. The outer end of the bore is closed by means of a plate 178 having a projection 179 extending a short distance into the bore, the projection 179 having an annular recess to accommodate a fluid seal 180. The projection 179 is formed with a channel 181 in registration with a passageway or duct 182 for conveying pressure fluid into and away from one end of the cylinder in member 168. The passage 182 communicates with a vertically disposed duct 183 which is connected with a tube 184 to suitable fluid control valve mechanism. The piston 174 is formed with an end section 185 secured to the piston rod 176 by means of a securing bolt 186.

The shaping die 162 is provided with a semicylindrical recess which is in registration with a similarly shaped recess formed in a block 188 secured to the shaping die 162 by means of bolts 189. The piston rod 176 is formed with an annular recess 190 aligned with the recesses formed in member 162 and block 188, the recesses receiving semiannularly shaped keys or locking members 192 for securing the piston rod 176 to the shaping die 162. A plate 193 secured by screws 194 to member 168 is provided with an annular recess accommodating a fluid seal 195 to prevent leakage of fluid along the piston rod 176.

Communicating passageways 196, 197 and tube 198 convey fluid into and away from the annular chamber 199 formed between the piston rod 176 and the wall of the cylinder accommodating the piston 174. Thus, by controlling the flow of pressure fluid to and from the chamber 199 and the cylinder at the lefthand end of the piston as viewed in Figure 14, the shell shaping member or die 162 is moved into and out of engagement with a muffler shell positioned above an end header placed in the support 40 adjacent the shaping dies 60 and 62.

Means are provided for limiting the movement of the shell shaping die 162 toward the muffler shell. Such means are essential to prevent crushing or distortion of the sheet metal shell. As illustrated in Figure 14, the shaping die 162 is provided with a pair of parallel slots 200 through which project bolts 201. The bolts form abutment means engaged by the ends of the slots 200 for limiting the movement of member 162 both into engagement with the shell and in its retracted position.

The shell shaping members 160 are likewise provided with hydraulic actuators of identical construction with that described in connection with the shell shaping members 162. In the operation of the shell shaping mechanism, all of the actuators for moving the sets of shaping dies 160 and 162 are concomitantly actuated so that the two sets of shaping dies are in engagement with the muffler shell at the same time. The electrical means for actuating a valve mechanism to admit pressure fluid to the outer ends of the cylinders in members 165 and 168 is brought into action after the muffler shell is manually placed above the header and against the guide member 158.

Provision is made for elevating or retracting the assembled muffler with the retractal movement of the ram 135 after the completion of a heading operation. In the apparatus for accomplishing this purpose, two forms of shell elevating mechanism are illustrated. When a muffler shell is equipped with a header assembled thereto at the upper end of the shell, one form of lifting device may be used to advantage while another form of lifting device may be used with the open-ended shell before a header has been fixed to one of the ends. In the use of the lifting devices, a series of muffler shells may be put through the operation of securing a header to one end of a shell and one form of lifting device used therewith and, when headers are to be secured to the opposite ends of the shells having one header already affixed thereto, the lifting fixture carried by the ram may be changed to accommodate shells having headers assembled to their upper ends.

In practice it has been found desirable to utilize two machines of the character disclosed in this application in adjacent relation, one equipped with one form of muffler shell lifting device and the other equipped with a different form particularly usable for lifting a headed shell out of the heading dies. Through the use of two machines, a header may be placed on a shell at the first machine or station, and the muffler with the single header assembled thereto transferred to the second machine or station where a header is secured to the other end of the shell. The principles of the invention apply whether one or two machines are used for the heading operations.

Figures 16 through 18 illustrate one form of muffler shell lifting device adapted to be secured to the member 144 forming a part of the vertical reciprocable ram construction, this form of lifting device being particularly adapted to receive an open end of a muffler shell when the same is positioned in the machine to receive a flanged header at its opposite end. The lifting device of this character includes a plate 220 adapted to be secured to the plate or pad 144 forming a part of the ram assembly. Arranged beneath the plate 220 is a mounting plate 223 to which is secured a central shell guiding member 225 by means of screws 226. The member 225 is formed with canted or angularly arranged entrant surfaces 228 for guiding the wall of a muffler shell S into contiguous engagement with opposed surfaces of the guide member 225 as shown in Figure 18.

Depending from the mounting plate 223 is a plurality of headed members or bolts 230 each equipped with a disk 231, the disks forming seats for expansive coil springs 233 fitting into sockets provided in a locking ring or member 235. The member 235 is formed with oppositely disposed recesses 236 within which are positioned elements 238, the elements being held in place by means of bolts 239. Each element is formed with shallow channels or grooves 240 tapered in the manner shown in Figure 18. Each of the channels 240 accommodates a clutch means in the form of a ball or sphere 242 arranged for engagement with the exterior wall of an open-ended shell S.

The depending legs of L-shaped members 244 are provided with elongated openings or slots 245 accommodating the balls or clutch members 242, the elongated openings being terminated at their lower ends by means of an abutment or wall portion 246 to limit the lowermost movement of the clutches or balls 242. Disposed adjacent each of the balls is a headed pin 247 disposed in aligned bores formed in members 223 and 244, the bores in plate 223 forming sockets accommodating expansive coil springs 249 which function to bias the clutches or balls 242 normally toward their lowermost positions.

The operation of this form of lifting device is as follows: The device is assembled to the ram plate 144 by suitable screws associated with the plate 220, the locking member or ring 235 being supported by the coil springs 233 which exert sufficient biasing pressure to normally hold the ring 235 in contact with the mounting plate 223. The operator positions a shell with its upper end open as shown in Figure 6 in the position to be acted upon by downward movement of the ram 135, the guide 156 positioning the shell so as to dispose the upper oval-shaped edge of the shell within a zone so that upon downward movement of the ram, the angular surfaces 228 and 248 guide the upper end portion of the muffler shell into locking or clutching engagement with the balls 242.

When the ram 135 moves downwardly, the upper edge of the shell is guided by the angular surfaces 228 and 248 into a position wherein the edge of the shell bottoms against or abuts the member 244, the clutches or spring-biased balls 242 being moved upwardly a sufficient distance to permit the shell wall to move to the position shown in Figure 18.

The relatively small coil springs 249 acting on the plungers or pins 247 bias the balls 242 along the tapered surfaces of the channels 240 so that the shell is wedgeably held to the member 225 in the manner illustrated in Figure 18. The downward movement of the ram is transmitted to the shell through the members 244 engaging the edge of the shell to seat the lower edge of the shell within the flange of a header mounted on the pedestal 40.

After the heading dies 60 and 62 have completed the operation of distorting the flange of the header into interlocking engagement with the shell wall, the hydraulic actuator 125 is brought into operation elevating or detracting the ram 135, the muffler engaging arrangement shown in Figures 16 through 18 and the shell which is frictionally held to the member 225 by the force of the locking clutches 242. When the ram 135 approaches its uppermost position, the locking ring structure contracts projections 250 carried by the frame structure of the machine causing the locking ring 235 and parts carried thereby to remain in a relatively stationary position while the plates 220, 223 and the central guide 225 continue upward movement with the ram causing the springs 233 to be compressed. As the member 225 moves upwardly relative to the members 235 and 244, the clutches or balls 242 are permitted movement in the tapered channels 240 so that the shell S is released from the lifting device.

When the machine or apparatus is used for placing the second header upon a shell, a modified form of lifting device is affixed to the ram 135 which is adapted for gripping the exterior surface of the muffler shell at diametrically opposed zones thereof. One form of arrangement for this purpose is illustrated in Figures 19 and 20. This construction is inclusive of a mounting plate 260 which is secured to and carried by the ram 135 by bolts or other fastening means (not shown). The mounting plate 260 is provided with threaded openings 262 adapted to receive threaded tenons formed on the upper ends of stub shafts or pins 264, the pins being provided with heads 265. A spacing strut or member 267 having openings to accommodate the pins 264 is provided as shown in Figure 20. Arms 268 and 269 are provided with openings to accommodate the pins 264 whereby the arms are supported for pivotal movement about the axes of the pins 264 and form means for engaging and gripping a muffler shell adjacent the header secured thereto. Each of the extremities of the arms is provided with a pad portion 270 preferably of a curvature to fit the exterior curved surface of the muffler shell to establish a substantial area of engagement between each arm and the shell. The opposite end of each of the arms 268 and 269 is formed with a cylindrical projection 272 which is adapted to be received in a bore formed in a motion transition fitting or block 274, the block being secured to the arms by means of bolts 275. Each of the fittings 274 is formed with a slot 277 forming a bifurcated portion, the furcations 278 being bored to received a pivot pin or shaft 280.

Disposed between the fittings or blocks 274 are toggle links 282 and 283 which are bored at their outer ends and through which extend the pins 280 whereby the toggle links are respectively pivoted to the blocks 274 for movement about the axes of the pins. Toggle link 282 is formed at its opposite end with furcations 285 and link 283 is formed with a tongue 287 as shown in Figure 19. The projections 285 and the tongue 287 are arranged in overlapping relation and are bored to accommodate a connecting pin or shaft 289 so as to provide for relative pivotal movement of the toggle links 282 and 283.

Disposed adjacent the upper limit of travel of the muffler guiding and elevating means are relatively stationary rollers 290 journalled on pins 291 adapted to the engaged by the curved exterior surfaces of the fittings or blocks 274 to release the muffler. When the ram approaches its lowermost position, the arms 268 and 269 engage and grip the exterior walls of the muffler shell. When the ram moves to its uppermost position after the completion of a header securing operation by the dies 60 and 62, the muffler is elevated with the ram as the arms 268 and 269 remain in engagement with the muffler during upward movement of the ram. When the ram approaches its uppermost position, the rollers 290 engage the fittings 274 moving the toggle links 282 and 283 upwardly thus moving the arms 268 and 269 out of gripping engagement with the muffler whereby the same may be removed from the machine.

The arrangement of hydraulic actuators and fluid conveying pipes or lines for the actuators and associated elements are diagrammatically illustrated in Figure 21 and the electrical devices and circuits for initiating the operation of and controlling the hydraulic actuators are illustrated in Figure 22. The arrangement includes a pair of solenoid-controlled hydraulic valve mechanisms 300 and 302 which are of conventional construction having solenoid-actuated piston valve elements 304 and 305 in the respective valve mechanisms. A reservoir or tank 306 contains a supply of liquid such as oil or other fluid which may be placed under pressure to actuate the components of the apparatus. Connected with the reservoir 306 is a pump 308 operated by an electric motor for building up fluid pressure in the fluid conveying lines or pipes connected with the fluid actuators.

It has been found in actual practice that a pressure of about a thousand pounds per square inch maintained in the oil feed lines is effective to actuate certain of the mechanisms. The pressure in the feed lines may be augmented by suitable booster mechanisms hereinafter described for building up higher pressures for operating the header securing dies of the apparatus. A pressure regulating valve 310 is disposed in the fluid pressure line 312 connecting the pump with the solenoid-actuated valve 300, a line 314 conveying pressure fluid to the solenoid-actuated valve 302. The coil CV–1 when energized causes the valve member 304 to be moved to a position wherein pressure fluid is conveyed through a pipe 316 to the upper end of the ram cylinder 125 forcing the piston 127 downward and moving the muffler shell into the recess of the header or end closure disposed upon the pedestal 40 adjacent the heading dies.

When the ram reaches its lowermost position, pressure above the piston 127 builds up to a predetermined value, for example 600 pounds per square inch, at which pressure the fluid pressure switch PS–3 is operated when the ram is in its lowermost position to prevent further increase in pressure in the cylinder 125. Secured to the ram piston is a microswitch S–2 which moves with the ram. When the ram is in its lowermost position the microswitch S–2, which is normally open, is closed to complete a circuit for energizing the solenoid coil CV–2 operating the valve 305 to direct pressure fluid through the pipe 318 for delivering the fluid to the large cylinder 320 of a pressure boosting or changing device 322. The booster 322 is equipped with a piston 324 of comparatively large area and a smaller piston 325 connected thereto is operable in a cylinder 326, the latter being connected through pipe 328, pressure switch PS–1 and pipes 329 and 330, the small cylinder 326 delivering fluid under high pressure to the actuators 66 and 67 arranged to operate the heading dies 60.

It has been found preferable to utilize a booster 322 for increasing the fluid pressure directed to the actuators 66 and 67 about two and a half times the pressure existing in the line 318. Thus a pressure of approximately a thousand pounds per square inch in the line 318 is increased to twenty-five hundred pounds per square inch operative upon the actuators 66 and 67. When the pressure in the hydraulic actuators 66 and 67 builds up to its maximum at the time the dies 60 have completed the bending operations upon the end zones of the flange of a header C, the pressure switch PS–1 is closed by high pressure built up in the line 328 causing operation of the solenoid coil CV–3 which actuates the valve member 305 to direct fluid under pressure to the dies 62. At the same time, the valve 305 establishes a return duct by way of the passage 318, pipe 334 and pipe 335 to permit return flow of liquid from the booster cylinder 320 into the reservoir 306.

In setting up fluid pressure for operating the dies 62, the high pressure fluid is directed through a pipe 337 to a high pressure booster or pressure increasing means 338 which is of a construction similar to the booster 322 but which is adapted to provide a higher pressure ratio. It has been found that the pressure ratio in the booster 338 should be about five to one, that is, the cross-sectional area of the booster cylinder 340 is five times the cross-sectional area of the cylinder 341. The small cylinder 341 is connected by a passage 342 with a pressure switch PS–2 and is connected with tubes or pipes 344, 345 and 346 for conveying fluid under pressure to the actuators 68 and 69 respectively operating the dies 62.

Due to the greater area of contact of the dies 62 with the side zones of the header and hence a greater amount of metal to be bent or worked, it is imperative that a high fluid pressure be transmitted to the actuators 68 and 69. The purpose of the pressure booster 338 is to elevate the fluid pressure in the actuators 68 and 69 so as to provide adequate force effective upon the dies 62 to cause the dies to properly bend or distort the metal of the header into interlocking engagement with the muffler shell.

When the dies 62 have reached the limit of their inward movement to complete a heading operation, the pressure builds up to a value sufficient to actuate the pressure switch PS–2 causing the solenoid coil CV–4 in the valve 300 to be actuated, the valve member 304 being moved to a position directing pressure fluid into the opposite ends of the hydraulic actuators 68 and 69 to cause the dies 62 to be retracted and the fluid on the opposite sides of the pistons of the actuators to be returned through valve mechanism 350 and return line 335 into the reservoir or tank 306. The energization of the coil CV–1 in moving the valve member 304 establishes connection with fluid passage 352 whereby the pressure fluid is directed through passage 352 into the ram cylinder 125 beneath the piston 127 so as to elevate the ram. When the ram 127 reaches its uppermost position, a cam member 357 carried by the ram actuates a switch S–1 shown in Figure 21 which is opened by engagement with the cam 357 and terminates the completion of a cycle of the apparatus in performing a header securing operation.

With further reference to Figure 22, it should be noted that coil CV–1 is connected in the circuit with a starter switch 360 which may be foot operated or manually operated as desired. The solenoid coil CV–2 in the valve 302 functions to actuate the hydraulic cylinders 66 and 67 to move the dies 60 into operative position for performing header operations. The solenoid coil CV–3 in the valve 302 directs pressure fluid through the high pressure booster 338 to the actuators 68 and 69 to move the dies 62 into heading position and at the same time directs fluid to the inner ends of the actuators 66 and 67 to retract the dies 60 simultaneously with the inward movement of the dies 62. The solenoid coil CV–4 actuates the valve 300 to direct pressure fluid to the inner ends of the hydraulic actuators 68 and 69 to cause the dies 62 to move away from the header after the completion of the flanging operation. The switch S2 is a normally open microswitch operated when the ram is in its lowermost position to prevent a rise of fluid pressure in the ram cylinder 125 above a predetermined value as hereinbefore mentioned. A safety switch S3 which is a single throw switch is of a manually operated type which may be opened at any time to render further operation of the apparatus ineffective. This switch is used in the event that some abnormality occurs in the operations and it is imperative to instantly stop the machine.

When the shell shaping or retaining dies 160 and 162 are utilized, they may be operated by fluid flow in lines or pipes connected with the pipes conveying pressure fluid to the ram cylinder 125. Thus the valve 304 when moved to a position to direct fluid under pressure through pipe 316 to the upper end of cylinder 125 also directs fluid under pressure to the outer ends of the cylinders formed in members 168 against the pistons 174 to move the shaping dies 160 and 162 inwardly into shell engaging position. These dies remain in shell engaging position until valve 304 is shifted by energization of coil CV–1 to direct fluid to the lower end of ram cylinder 125 which also directs fluid to the chambers 199 of the shaping die actuators to retract the shaping dies from engagement with the muffler shell or body.

Figure 33 illustrates a means that may be employed for automatically stripping a headed muffler from a muffler lifting device after the completion of a heading operation and after the ram has been retracted and the work or muffler moved upwardly out of the zone of the heading and shaping dies. The arrangement shown in Figure 23 is inclusive of an arm 380 secured upon a shaft 381 journalled upon a suitable support 383 which may be secured to the plate 29 which connects the uprights or posts 27 of the machine frame. Also fixedly secured to the shaft 381 is an arm or member 386 provided with a slot 387 adapted to accommodate a fitting 388 adjustable in the slot 387. The fitting 388 is provided with a pin 390 which forms a pivot connection with a piston rod 392 of a hydraulic actuator 393, the rod 392 carrying a piston 395 reciprocable in a cylinder 396. The cylinder is pivotally connected to a support 397 by means of a shaft or pin 398. Fluid may be introduced at the ends of the cylinder through tubes 399 and 400 for causing reciprocable movement of the rod 392 to cause oscillatory movement of the arm 380 about the axis of the shaft 381.

The arm 380 is equipped with means for gripping or seizing the muffler S when the latter is in its elevated position to effect a transfer of the muffler away from the heading machine. In one form of gripping device, the arm 380 may be equipped with a housing or casing 402 containing one or more electromagnets adaptable to be energized from a source of electrical energy through cables or conductors 404. A conveyor 406 preferably of the endless belt type may be disposed with the upper flight 407 thereof in a position to receive mufflers from the heading machine for conveying the mufflers to another station or apparatus for further processing operations. The electromagnet construction in the housing 402 may be energized at approximately the time that the ram of the muffler heading machine approaches its upper limit of movement, and hence the energization of the electromagnet construction exerts a substantial electromotive force adjacent the muffler causing the latter to be attracted to and held by the electromagnetic arrangement as illustrated in Figure 23. The actuator 393 may be operated by the flow of pressure fluid into the cylinder above the piston 395 causing the latter to move downwardly in the cylinder and hence the arm 380 to be swung to the dotted line position shown in Figure 23. When the arm 380 and the electromagnetic construction carried thereby with the muffler gripped to the electromagnetic device are moved to the dotted line position as shown in Figure 23, the circuit to the electromagnetic construction may be interrupted by a microswitch 408, relieving or eliminating the gripping force acting on the muffler S, the latter then dropping by gravity onto the upper flight 407 of the conveyor 406 which moves the muffler away from the heading machine.

The electrical circuits for controlling the muffler removing mechanism and the electromagnet arrangement are illustrated in Figure 22. S–4 designates a normally open microswitch which is operated by the arm 380 for actuating the electromagnet in housing 402. The switch S–5 is a normally closed microswitch operated to open the circuit to the electromagnet which is operated by the arm 380 when the latter has completed a muffler removing operation. CV–5 designates the electromagnet for establishing gripping engagement with the muffler. The hydraulic connections for the ejector cylinder are illustrated diagrammatically in Figure 21 wherein the hydraulic actuator 393 is intercalated with the fluid circuit for the hydraulic actuator 125 for supplying fluid under pressure to the actuator 399 to swing the arm 380 for removing a muffler from the heading machine.

In order to facilitate withdrawal or removal of a headed shell from the zone of the heading dies upon completion of a heading operation, a hydraulically actuated knockout device 425 is disposed beneath the pedestal 40 as shown in Figure 4 and diagrammatically illustrated in Figure 21. The knockout device 425 is arranged to engage the inlet or outlet tube of a muffler head and is actuated at the time the ram piston 127 initiates its upward or return stroke. It serves to overcome a tendency of the muffler head to adhere to the pedestal.

The check valve 428 allows fluid under pressure in the line 352 to charge or build up pressure in an accumulator 430 during the upward or return stroke of the ram piston 127. The accumulator 430 provides pressure for pilot lines of the solenoid-operated valves and also provides holding pressure in the ram cylinder 125 whenever the pump pressure momentarily falls below the pressure in the accumulator 430. The valve 432 is arranged to allow fluid to drain from the remote control valve 434 when no pressure exists in either line 352 or 314 so as to control the pump pressure effective on the down or operative stroke of the arm piston 127. The valves 350 and 435 are sequence valves operable to render effective the pressure increasing devices or boosters 338 and 322 at predetermined fluid pressures.

There is illustrated in Figure 22 contact relays CR–1 through CR–5 intercalated in the circuits which control the actuators in the manner hereinbefore described.

It is apparent that, within the scope of the invention, modifications and different arrangements may be made other than is herein disclosed, and the present disclosure is illustrative merely, the invention comprehending all variations thereof.

What I claim is:

1. Apparatus for affixing end heads to oval-shaped sheet metal muffler bodies including, in combination, a frame; two pairs of bending dies operable at right angles to each other in the same horizontal plane and slidably supported upon the frame; fluid actuated means for moving each of the bending dies; a plurality of muffler body shaping dies movably supported upon the frame; means disposed adjacent the pairs of bending dies for receiving and supporting a flanged end head; fluid actuated means for moving the shaping dies into engagement with a muffler body; means including a ram member engageable with an end of the muffler body; means for actuating said ram member longitudinally into engagement with the muffler body to move the latter into interengaging relation with the flanged end head, said pairs of bending dies being successively operable to bend portions of the flanged end head into interlocking engagement with the muffler body, and means for initiating the operation of said fluid actuated means to control the movements of said member and said shaping and bending dies.

2. Apparatus for affixing headers to hollow oval-shaped muffler bodies including, in combination, a frame; means for supporting a header upon the frame; a first set of dies movably supported upon the frame and adapted for engagement with opposed zones of the header; a second set of dies movably supported upon the frame and horizontally disposed for movement in directions at right angles to said first set of dies and adapted for engagement with other opposed zones of the end header; fluid actuated means for actuating said sets of dies arranged to establish operation of each set in sequential relation; means for positioning a hollow body with an end portion thereof adjacent the header; means for moving said hollow body in the direction of its length into overlapping engagement with the header, and electrically operated control means for initiating sequential operation of the body moving means and die actuating means whereby said sets of dies are successively moved into engagement with the header for distorting portions of the header into permanent interlocking engagement with the hollow body, said sets of dies having portions adapted to engage the header in overlapping regions.

3. Apparatus for securing end closures to muffler shells including, in combination, a frame; means for receiving and supporting an end closure upon the frame; a set of bending dies movably supported upon the frame and arranged for engagement with opposed zones of the end closure; a second set of bending dies horizontally disposed for movement in directions at right angles to said first-mentioned set of dies for engaging other zones on the end closure; means for positioning a shell with an end portion thereof adjacent the end head; a plurality of members for shaping the shell, means for simultaneously actuating said members into engagement with the shell ram operated means slidably supported upon the frame and engageable with the shell for moving the shell into overlapping engagement with the end closure; fluid pressure actuated means for moving each set of dies; fluid actuated means for moving said ram operated member; means for adjusting the initial position of said ram operated means with respect to the frame to accommodate shells of different lengths, and electrically energized control means for initiating sequential operation of said sets of dies whereby said sets of dies are successively moved into engagement with the end closure for distorting portions of both the end closure and shell inwardly to establish a permanent connection between the end closure and shell.

4. Apparatus for securing end closures to muffler shells including, in combination, a frame; means for receiving and supporting an end closure upon the frame; a set of dies movably supported upon the frame and arranged for engagement with opposed zones of the end closure; a second set of dies horizontally disposed for movement in directions at right angles to said first-mentioned set of dies for engaging other zones on the end closure; means for positioning a shell with an end portion thereof adjacent the end closure; means slidably supported upon the frame and adapted for gripping engagement with the shell for moving the shell into overlapping engagement with the end closure; fluid operated means for actuating each set of dies; fluid actuated means for moving said shell gripping means, and electrically energized control means for initiating sequential operation of said pressure fluid actuated means whereby said shell gripping means moves the shell into overlapping engagement with the closure and said sets of dies are successively moved into engagement with the end closure for distorting both the end closure and shell inwardly to establish a permanent connection between the end closure and shell, said shell gripping means being arranged to move the shell and end closure away from said dies upon completion of the connection between the end closure and shell.

5. Apparatus for securing recessed oval-shaped end closures to oval-shaped muffler shells including, in combination, a frame; means on said frame for receiving and supporting an end closure; a pair of bending dies slidably mounted upon said frame and arranged for movement diametrically of the end closure; a second pair of bending dies slidably mounted upon the frame for movement substantially at right angles to the direction of movement of said first-mentioned pair of dies; guiding means including a plurality of fluid actuated members engageable with an end zone of the shell for shaping the shell to the contour of the end closure, for positioning a muffler shell with an end portion adjacent the end closure; hydraulically actuated means for moving the shell guiding means and shell to a position whereby an end portion of the shell is disposed in the recess in the end head; individual hydraulically actuated means for actuating each pair of bending dies, and electrically energized means for operating the hydraulic means to sequentially move said muffler guiding means, said first pair of dies and said second pair of dies whereby the dies bend a wall of the recess on the closure into interlocking engagement with the shell to join the closure and shell together.

6. Apparatus for securing end closures to oval-shaped muffler shells including, in combination, a frame; a pedestal on the frame adapted to support an oval-shaped end closure; means for positioning a shell with an end thereof adjacent the closure; a plurality of relatively movable members engageable with the shell for shaping same to the contour of the closure; fluid actuated means for simultaneously moving said members into engagement with the shell, means for moving the shell lengthwise into overlapping relation with the closure; two sets of opposed closure distorting dies horizontally operable sequentially at right angles to each other and movably disposed adjacent the shell shaping members; and means for actuating said die for sequentially distorting portions of the closure into engagement with the shell to permanently join the closure and shell together, said closure distorting dies being configurated to engage the end closure in overlapping regions.

7. Apparatus for securing end closures to oval-shaped muffler shells including, in combination, a frame; a pedestal on the frame adapted to support an end closure; means for positioning a shell in a vertical position with an end thereof adjacent the closure; a plurality of relatively movable members engageable with the shell for shaping same to the contour of the closure; means for moving the shell into overlapping relation with the closure; two sets of opposed fluid pressure actuated closure distorting dies horizontally operable sequentially at right angles to each other and movably disposed adjacent the shell shaping members; means for actuating said dies for distorting portions of the closure into engagement with the shell to permanently join the closure and shell together, said closure distorting dies having portions adapted to engage the end closure in overlapping regions, and electromagnetic means engageable with the shell for removing the assembled muffler shell and closure from the apparatus.

References Cited in the file of this patent

UNITED STATES PATENTS

| 227,823 | Perkins | May 18, 1880 |
| 862,634 | Griffin | Aug. 6, 1907 |
| 2,331,325 | Jensen | Oct. 12, 1943 |
| 2,331,344 | Powers | Oct. 12, 1943 |